United States Patent
Xiao

(10) Patent No.: US 11,866,069 B2
(45) Date of Patent: Jan. 9, 2024

(54) METHOD FOR SELECTING PARKING LOCATION, INTELLIGENT CONTROL DEVICE AND AUTONOMOUS DRIVING VEHICLE

(71) Applicant: Shenzhen Guo Dong Intelligent Drive Technologies Co., Ltd, Shenzhen (CN)

(72) Inventor: Jianxiong Xiao, Shenzhen (CN)

(73) Assignee: Shenzhen Guo Dong Intelligent Drive Technologies Co., Ltd, Shenzhen (CN)

( * ) Notice: Subject to any disclaimer, the term of this patent is extended or adjusted under 35 U.S.C. 154(b) by 39 days.

(21) Appl. No.: 17/482,452

(22) Filed: Sep. 23, 2021

(65) Prior Publication Data

US 2022/0242458 A1 Aug. 4, 2022

(30) Foreign Application Priority Data

Feb. 2, 2021 (CN) .......................... 202110141603.3

(51) Int. Cl.
  *B60W 60/00* (2020.01)
  *B60R 25/24* (2013.01)
  (Continued)

(52) U.S. Cl.
  CPC ....... *B60W 60/00253* (2020.02); *B60R 25/24* (2013.01); *B60W 30/06* (2013.01); *G01C 21/32* (2013.01); *G01C 21/343* (2013.01)

(58) Field of Classification Search
  CPC . B60W 60/00253; B60W 30/06; B60R 25/24; G01C 21/32; G01C 21/343;
  (Continued)

(56) References Cited

U.S. PATENT DOCUMENTS

2015/0346727 A1* 12/2015 Ramanujam ......... G05D 1/0088
  701/23
2018/0373249 A1* 12/2018 Choi .................. G01C 21/3685
(Continued)

FOREIGN PATENT DOCUMENTS

| CN | 102564427 A | 7/2012 |
| CN | 111696382 A | 9/2020 |
| CN | 112180923 A | 1/2021 |

*Primary Examiner* — Anne Marie Antonucci
*Assistant Examiner* — Jewel Ashley Kuntz
(74) *Attorney, Agent, or Firm* — Andrew C. Cheng

(57) ABSTRACT

A method for selecting parking location for an autonomous driving vehicle is provided. The method comprises steps of: obtaining a request of a user; constructing a first map according to a current location of the user, a first parking location, and a high-precision map; obtaining a second parking location selected by the user on the first map; controlling the autonomous driving vehicle to drive to the second parking location, and calculating distance between a current location of the autonomous driving vehicle and the second parking location; when the distance is less than a preset distance, constructing a second map according to the current location of the autonomous driving vehicle, the second parking location, and the high-precision map; controlling the autonomous driving vehicle to drive to the second parking location selected by the user on the second map. Furthermore, an intelligent control device and an autonomous driving vehicle are also provided.

20 Claims, 8 Drawing Sheets

(51) Int. Cl.
*B60W 30/06* (2006.01)
*G01C 21/32* (2006.01)
*G01C 21/34* (2006.01)

(58) Field of Classification Search
CPC ............ G01C 21/3614; G01C 21/3685; G01C 21/3811; G01C 21/3461; B62D 15/0285; G08G 1/096725; G08G 1/0969
See application file for complete search history.

(56) References Cited

U.S. PATENT DOCUMENTS

| 2020/0005641 | A1* | 1/2020 | Park ........................ G08G 1/168 |
| 2020/0130676 | A1* | 4/2020 | Smid ..................... G05D 1/0231 |
| 2020/0202716 | A1* | 6/2020 | Edwards .......... G08G 1/096855 |
| 2020/0242924 | A1* | 7/2020 | Publicover ............. G08G 1/087 |
| 2021/0188325 | A1* | 6/2021 | Ogura ................ G01C 21/3685 |

\* cited by examiner

METHOD FOR SELECTING PARKING LOCATION, INTELLIGENT CONTROL DEVICE AND AUTONOMOUS DRIVING VEHICLE

CROSS REFERENCE TO RELATED APPLICATION

This non-provisional patent application claims priority under 35 U.S.C. § 119 from Chinese Patent Application No. 202110141603.3 filed on Feb. 2, 2021, the entire content of which is incorporated herein by reference.

TECHNICAL FIELD

The disclosure relates to the field of autonomous driving technology, and in particular to a method for selecting parking location, an intelligent control device, and an autonomous driving vehicle.

BACKGROUND

Autonomous driving vehicles on the market are usually with a level-four autonomous system. The autonomous driving vehicles with level-four autonomous system can communicate with users, obtain locations of the users and users' desired parking locations, so as to provide users with fixed-point parking services. In practical applications, most users can not specify exact parking locations for getting on or off when they take a taxi, or parking locations specified by the users do not allow parking or getting on and off. For example, when there is no parking space at a user-specified parking location, the user-specified parking location is illegal, or the user-specified parking location is subjected to traffic control, and the autonomous driving vehicles may be unable to reach the user-specified location accurately that the autonomous driving vehicles can only park at other locations nearby. Or, in some other cases, the users may request to get off before the autonomous driving vehicles reach its destination. Or after the autonomous driving vehicles arrives at its destination, the users ask to drive to another location to get on and off the vehicles.

Therefore, how to select parking locations for autonomous driving vehicles is an urgent problem to be solved.

SUMMARY

The disclosure provides a method for selecting parking location, an intelligent control device, and an autonomous driving vehicle, achieve the effect that the autonomous driving vehicle can accurately reach the parking location specified by the users.

A first aspect of the disclosure provides a method for selecting parking location for an autonomous driving vehicle. The method includes steps of: obtaining a request of a user, the request comprising a current location of the user and a first parking location inputted by the user; constructing a first map according to the current location of the user, the first parking location, and a high-precision map, and displaying the first map, the first map comprising one or more second parking locations for the user to select, the one or more second parking locations being generated according to the first parking location; obtaining the second parking location selected by the user on the first map; controlling the autonomous driving vehicle to drive to the second parking location, and calculating distance between a current location of the autonomous driving vehicle and the second parking location; when the distance is less than a preset distance, constructing a second map according to the current location of the autonomous driving vehicle, the second parking location, and the high-precision map, and displaying the second map, the second map comprising confirmation information of the second parking location for the user to select; determining whether the confirmation information of the second parking location is obtained; controlling the autonomous driving vehicle to drive to the second parking location to perform a parking operation when the confirmation information of the second parking location is obtained; displaying a third parking location on the second map for the user to select when the confirmation information of the second parking location is not obtained; and controlling the autonomous driving vehicle to drive to the third parking location to perform the parking operation when the third parking location selected by the user on the second map is obtained.

A second aspect of the disclosure provides an intelligent control device. The intelligent control device comprises a memory configured to store program instructions; and a processor configured to execute the program instructions to enable the intelligent control device to perform a method for selecting parking location for an autonomous driving vehicle, wherein the method comprises the steps of: obtaining a request of a user, the request comprising a current location of the user and a first parking location inputted by the user; constructing a first map according to the current location of the user, the first parking location, and a high-precision map, and displaying the first map, the first map comprising one or more second parking locations for the user to select, the one or more second parking locations being generated according to the first parking location; obtaining the second parking location selected by the user on the first map; controlling the autonomous driving vehicle to drive to the second parking location, and calculating distance between a current location of the autonomous driving vehicle and the second parking location; when the distance is less than a preset distance, constructing a second map according to the current location of the autonomous driving vehicle, the second parking location, and the high-precision map, and displaying the second map, the second map comprising confirmation information of the second parking location for the user to select; determining whether the confirmation information of the second parking location is obtained; controlling the autonomous driving vehicle to drive to the second parking location to perform a parking operation when the confirmation information of the second parking location is obtained; displaying a third parking location on the second map for the user to select when the confirmation information of the second parking location is not obtained; and controlling the autonomous driving vehicle to drive to the third parking location to perform the parking operation when the third parking location selected by the user on the second map is obtained.

A third aspect of the disclosure provides an autonomous driving vehicle. The autonomous driving vehicle comprises a car body and an intelligent control device, the intelligent control device comprising a memory configured to store program instructions and a processor configured to execute the program instructions to enable the intelligent control device to perform a method for selecting parking location for an autonomous driving vehicle, wherein the method comprises the steps of: obtaining a request of a user, the request comprising a current location of the user and a first parking location inputted by the user; constructing a first map according to the current location of the user, the first parking location, and a high-precision map, and displaying the first map, the first map comprising one or more second parking locations for the user to select, the one or more second parking locations being generated according to the first parking location; obtaining the second parking location selected by the user on the first map; controlling the autonomous driving vehicle to drive to the second parking location, and calculating distance between a current location of the autonomous driving vehicle and the second parking location; when the distance is less than a preset distance, constructing a second map according to the current location of the autonomous driving vehicle, the second parking location, and the high-precision map, and displaying the second map, the second map comprising confirmation information of the second parking location for the user to select; determining whether the confirmation information of the second parking location is obtained; controlling the autonomous driving vehicle to drive to the second parking location to perform a parking operation when the confirmation information of the second parking location is obtained; displaying a third parking location on the second map for the user to select when the confirmation information of the second parking location is not obtained; and controlling the autonomous driving vehicle to drive to the third parking location to perform the parking operation when the third parking location selected by the user on the second map is obtained.

The method for selecting parking location and intelligent control device and autonomous driving vehicle, construct the first map according to the current location of the user and the first parking location, and obtain the second parking location selected by the user on the first map. As a result, the user's location can be accurately confirmed through the high-precision map and the autonomous driving vehicle do not need a conversion between ordinary electronic map and the high-precision map. Furthermore, it reduces time for confirming the user's location and improves the user's riding experience. When the distance between the current location of the autonomous driving vehicle and the parking location is less than the preset distance, the confirmation information about the parking location from the user is obtained, and a map with a more accurate parking location is provided for the user, as a result, it is ensured that the user can get on and off the autonomous driving vehicle at the accurate parking location, it can save the user's time, and it also can improves the user's satisfaction with pick-up and drop-off services of the autonomous driving vehicle.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

DETAILED DESCRIPTION OF THE EMBODIMENTS

In order to make purpose, technical solution and advantages of the disclosure more clearly, the disclosure is further described in detail in combination with drawings and embodiments. It is understood that the specific embodiments described herein are used only to explain the disclosure and are not used to define it. On the basis of the embodiments in the disclosure, all other embodiments obtained by ordinary technicians in this field without any creative effort are covered by protection of the disclosure.

Terms "first", "second", "third", "fourth", if any, in specification, claims and drawings of this application are used to distinguish similar objects and need not be used to describe any particular order or sequence of priorities. It should be understood that data are interchangeable when appropriate, in other words, the embodiments described can be implemented in order other than what is illustrated or described here. In addition, terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that description refers to "first", "second", etc. in the disclosure are for descriptive purpose only and neither be construed or implied relative importance nor indicated as implying number of technical features. Thus, feature defined as "first" or "second" can explicitly or implicitly include one or more features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
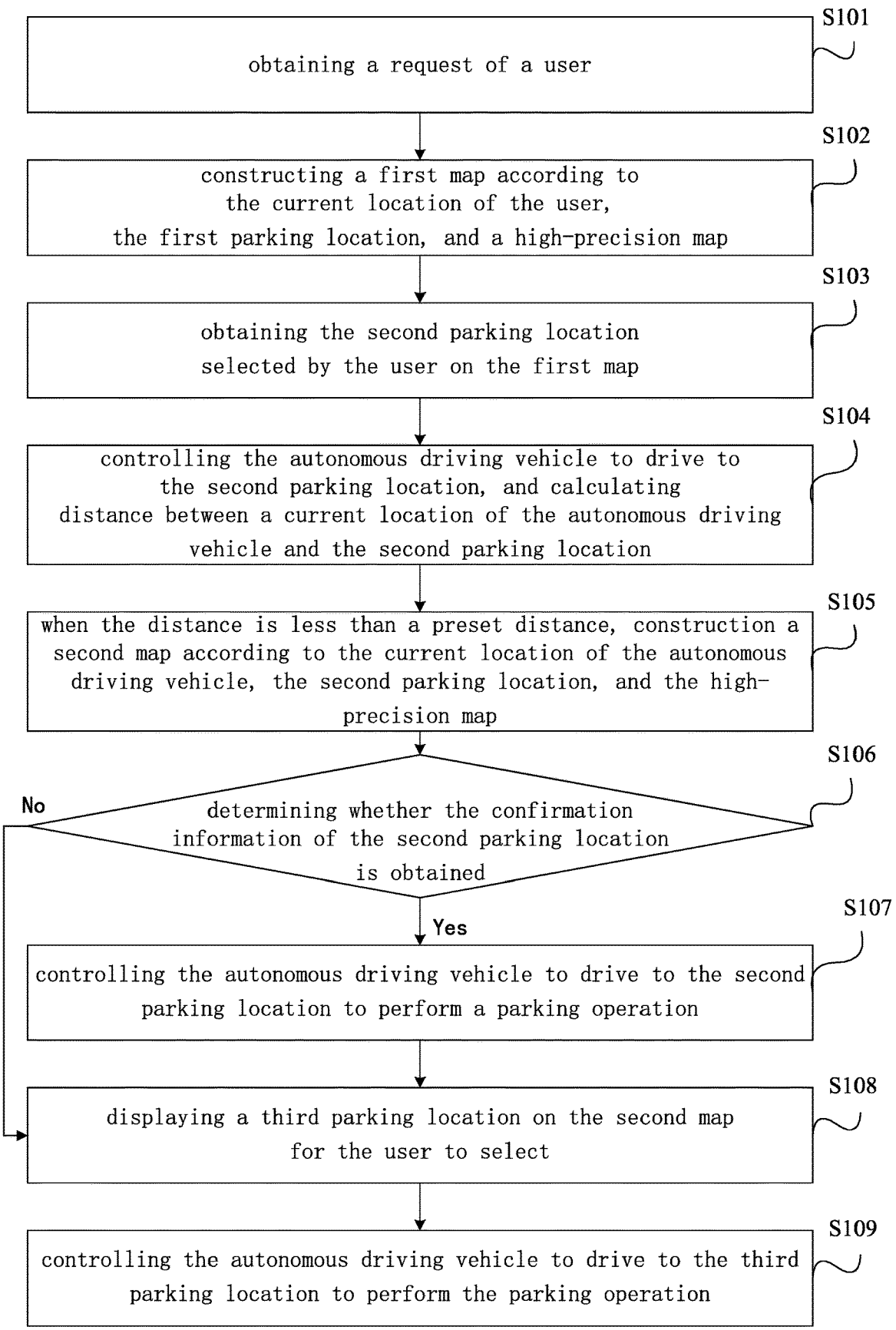
FIG. 1 illustrates a flow diagram of a method for selecting parking location in accordance with a first embodiment.

Referring to FIG. 1, FIG. 1 illustrates a flow diagram of a method for selecting parking location in accordance with a first embodiment. The method for selecting parking location for an autonomous driving vehicle in accordance with the first embodiment includes the following steps.

In step S101, a request of a user is obtained. The request includes a current location of the user and a first parking location inputted by the user. In detail, the request sent by the user through a mobile terminal is obtained, the request includes the current location of the user and the first parking location inputted by the user. The first parking location includes a parking location to be determined for boarding or a parking location to be determined for alighting. The mobile terminal can be a mobile device that can communicate through a communication network, such as a smart phone, a smart tablet, or a laptop. For example, an autonomous driving vehicle 100 obtains a boarding request sent by the user through the smart phone. The boarding request includes the current location of the user and the parking location to be determined for boarding.

In step S102, a first map is constructed according to the current location of the user, the first parking location, and a high-precision map, and displaying the first map. The first map includes one or more second parking locations for the user to select. The one or more second parking locations are generated according to the first parking location. The first map is a map that can be directly recognized by the autonomous driving vehicle. In detail, the autonomous driving vehicle 100 constructs the first map based on the high-precision map. Detail content about step S102 can refer to step S1021-step S1023.

In step S103, the second parking location selected on the first map by the user is obtained. In detail, when the user requests to board a car, the user can select the second parking location on the first map through the mobile device. When the user requests to get off the car, the user can select the second parking location on the first map through the mobile device or an input device installed on the autonomous driving vehicle, such as a touch screen.

In step S104, an autonomous driving vehicle is controlled to drive to the second parking location, and distance between a current location of the autonomous driving vehicle and the second parking location is calculated.

In step S105, when the distance is less than a preset distance, a second map is constructed according to the current location of the autonomous driving vehicle, the second parking location, and the high-precision map, and displaying the second map. The second map includes confirmation information of the second parking location for the user to select. The second map is a map that can be directly recognized by the autonomous driving vehicle. The second map contains a smaller area and more details than the first map. For example, only one parking location is displayed on the first map. Not only the parking location is displayed on the second map, but also trees around the parking location or other surrounding scenery. In detail, the autonomous driving vehicle 100 constructs the second map based on the high-precision map. Detail content about step S105 can refer to step S1051-step S1053.

In some embodiments, before the autonomous driving vehicle reaches its destination, the user may request to get off early. After the autonomous driving vehicle 100 constructs the second map, the second map will be displayed through an on-board output device or the mobile device, such as an on-board tablet and the smart phone. When the user needs the autonomous driving vehicle 100 to park in advance, the user can re-input the parking location through the on-board tablet or the smart phone.

In other embodiments, after the autonomous driving vehicle reaches its destination, the user requests to drive to another location to get on or off. After the autonomous driving vehicle 100 constructs the second map, the second map will be displayed through the on-board output device or the mobile device, such as an on-board tablet and the smart phone. When the user needs the autonomous driving vehicle 100 to park in another location, the user can re-input the parking location through the on-board tablet or the smart phone.

In step S106, it is determined that whether the confirmation information of the second parking location is obtained. In detail, the confirmation information of the second parking location is obtained through the mobile device or the on-board input device.

In step S107, the autonomous driving vehicle is controlled to drive to the second parking location to perform a parking operation when the confirmation information of the second parking location is obtained.

In step S108, a third parking location is displayed on the second map for the user to select when the confirmation information of the second parking location is not obtained. The third parking location is an available parking location within a preset range of the second parking location. The preset range is set according to actual needs. In detail, the third parking location on the second map is displayed through the mobile device or the on-board output device for the user to select. Then the third parking location selected by the user is obtained.

In step S109, the autonomous driving vehicle is controlled to drive to the third parking location to perform the parking operation when the third parking location selected by the user on the second map is obtained.

In the above embodiment, the first map is constructed according to the current location of the user and the first parking location, and the second parking location selected by the user on the first map is obtained. As a result, the user's location can be accurately confirmed through the high-precision map and the autonomous driving vehicle do not need a conversion between ordinary electronic map and the high-precision map. Furthermore, it reduces time for confirming the user's location and improves the user's riding experience. When the distance between the current location of the autonomous driving vehicle and the parking location is less than the preset distance, the confirmation information about the parking location from the user is obtained, and a map with a more accurate parking location is provided for the user, as a result, it is ensured that the user can get on and off the autonomous driving vehicle at the accurate parking location; it can save the user's time, and it also can improves the user's satisfaction with pick-up and drop-off services of the autonomous driving vehicle.

Figure 2:
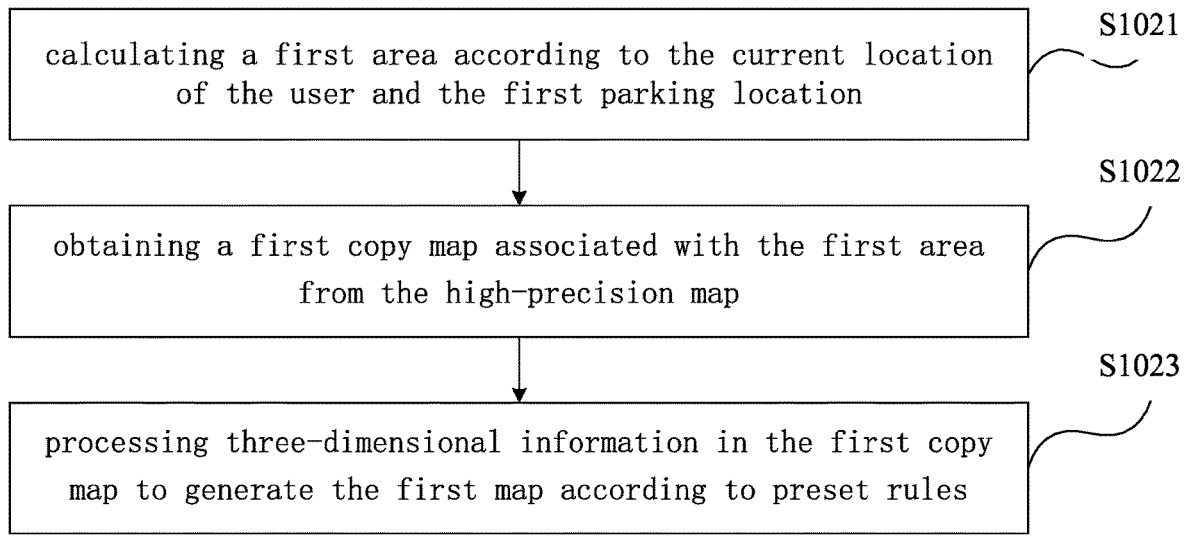
FIG. 2 illustrates a first sub flow diagram of a method for selecting parking location in accordance with the first embodiment.

Referring to FIG. 2, FIG. 2 illustrates a first sub flow diagram of a method for selecting parking location in accordance with the first embodiment. The step S102 includes the following steps.

In step S1021, a first area is calculated according to the current location of the user and the first parking location. The first area includes an area including a designated range of the current location of the user and the first parking location. For example, the first area includes both the current location of the user and the first parking location. The first area should be calculated based on actual geographic information.

In step S1022, a first copy map associated with the first area is obtained from the high-precision map.

In step S1023, three-dimensional information in the first copy map is processed to generate the first map according to preset rules. Detail content about step S1023 can refer to step S10231-step S10235.

In this embodiment, the first map is constructed according to the current location of the user and the high-precision map. The first map is constructed including only the current location of the user and the first parking location input by the user, which saves amount of calculation and makes the autonomous driving vehicle react faster.

Figure 3:
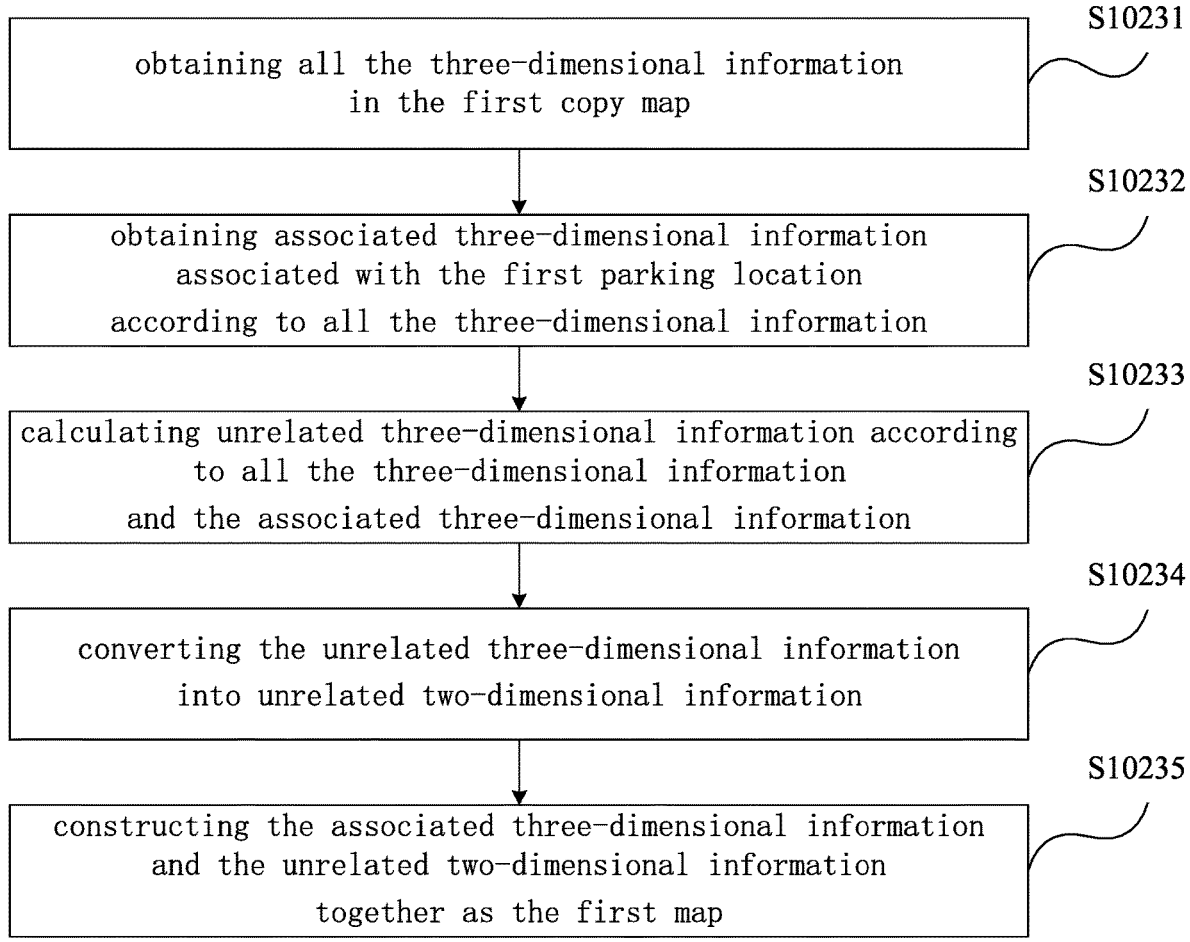
FIG. 3 illustrates a second sub flow diagram of a method for selecting parking location in accordance with the first embodiment.

Referring to FIG. 3, FIG. 3 illustrates a second sub flow diagram of a method for selecting parking location in accordance with the first embodiment. The step S1023 includes the following steps.

In step S10231, all the three-dimensional information in the first copy map is obtained.

In step S10232, associated three-dimensional information associated with the first parking location is obtained according to all the three-dimensional information.

In step S10233, unrelated three-dimensional information is calculated according to all the three-dimensional information and the associated three-dimensional information.

In step S10234, the unrelated three-dimensional information is converted into unrelated two-dimensional information.

In step S10235, the associated three-dimensional information and the unrelated two-dimensional information are constructed together as the first map.

In this embodiment, the unrelated three-dimensional information is converted into the unrelated two-dimensional information, so part of the unrelated three-dimensional information is hidden. So that the user can more intuitively know relationship between the current location of the autonomous driving vehicle and the current location of himself/herself based on the unrelated two-dimensional information. Therefor, the user can select the parking location more accurately, so that the autonomous driving vehicle can drive to the parking location as soon as possible.

Figure 4:
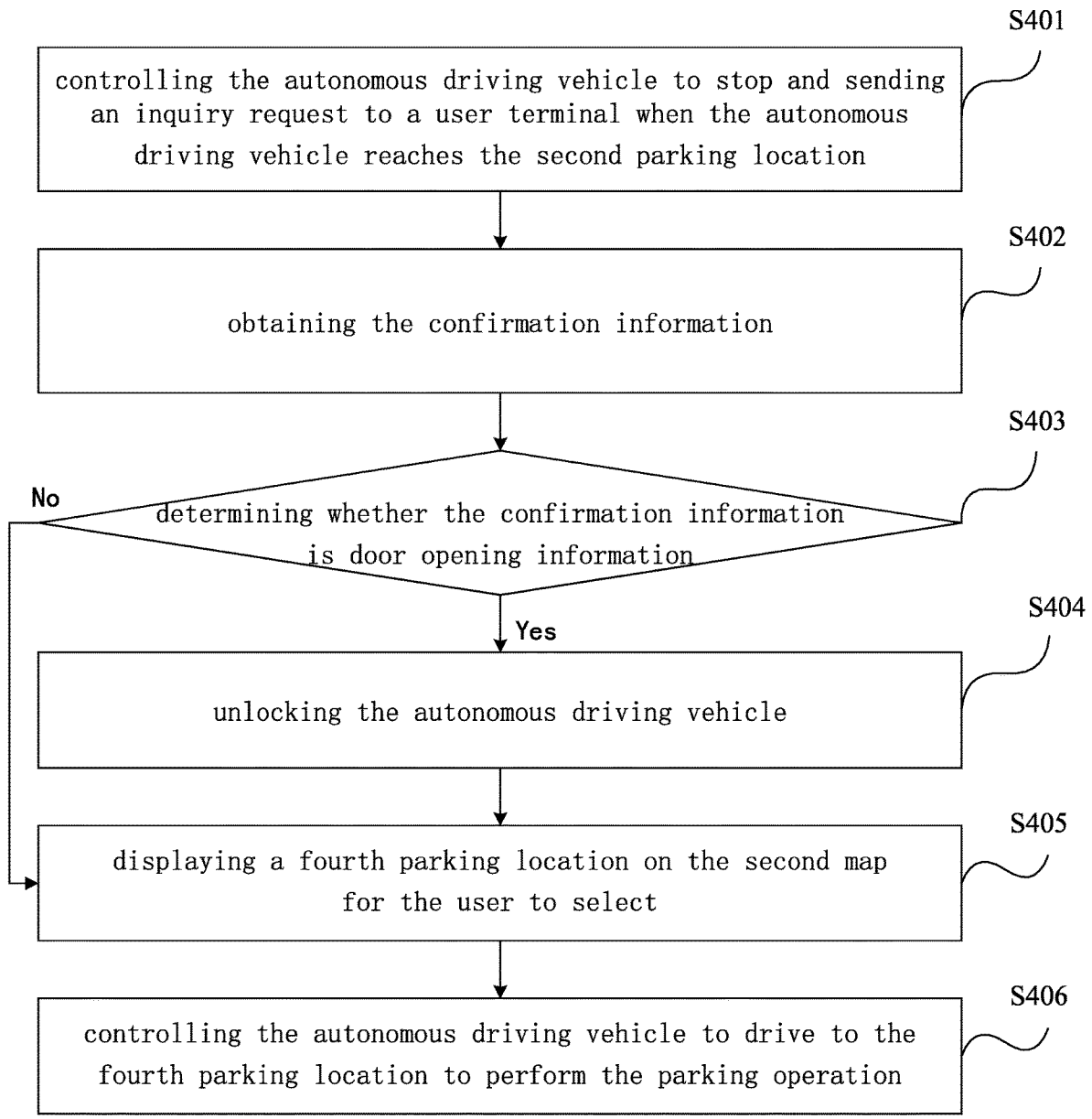
FIG. 4 illustrates a sub flow diagram of a method for selecting parking location in accordance with a second embodiment.

Referring to FIG. 4, FIG. 4 illustrates a sub flow diagram of a method for selecting parking location in accordance with a second embodiment. The difference between the method for selecting parking location in accordance with the second embodiment and the first embodiment is that the method for selecting parking location in accordance with the second embodiment further includes the following steps.

In step S401, the autonomous driving vehicle is controlled to stop and an inquiry request is sent to a user terminal when the autonomous driving vehicle reaches the second parking location. The inquiry request is to ask the user whether to get off at the current location. In detail, when the autonomous driving vehicle reaches at the parking location, the autonomous driving vehicle stops at the parking location temporarily, and then sends the user an inquiry whether to get off there.

In step S402, the confirmation information is obtained.

In step S403, it is determined that whether the confirmation information is door opening information.

In step S404, the autonomous driving vehicle is unlocked when the confirmation information is the door opening information. In this embodiment, the door is opened after the door opening information is obtained, which improves safety when the user getting off the autonomous driving vehicle.

In step S405, a fourth parking location is displayed on the second map for the user to select when the confirmation information is not the door opening information. The fourth parking location is an available parking location within a preset range of the second parking location. The preset range is set according to actual needs. In detail, when the user is not satisfied with the current parking location and does not want to get off, the autonomous driving vehicle will reacquire the parking location selected by the user and enter a driving state again.

In step S406, the autonomous driving vehicle is controlled to drive to the fourth parking location to perform the parking operation when the fourth parking location selected by the user on the second map is obtained.

In this embodiment, after the autonomous driving vehicle is stop at the parking location, the autonomous driving vehicle will confirm to the user again whether to stop at the current location. So as to prevent the current location from being unsuitable for parking, and the user finding that the current location does not match an expected location. Therefor, the user can get on or off the autonomous driving vehicle in a satisfactory location, and provide the user with a better riding experience.

Figure 5:
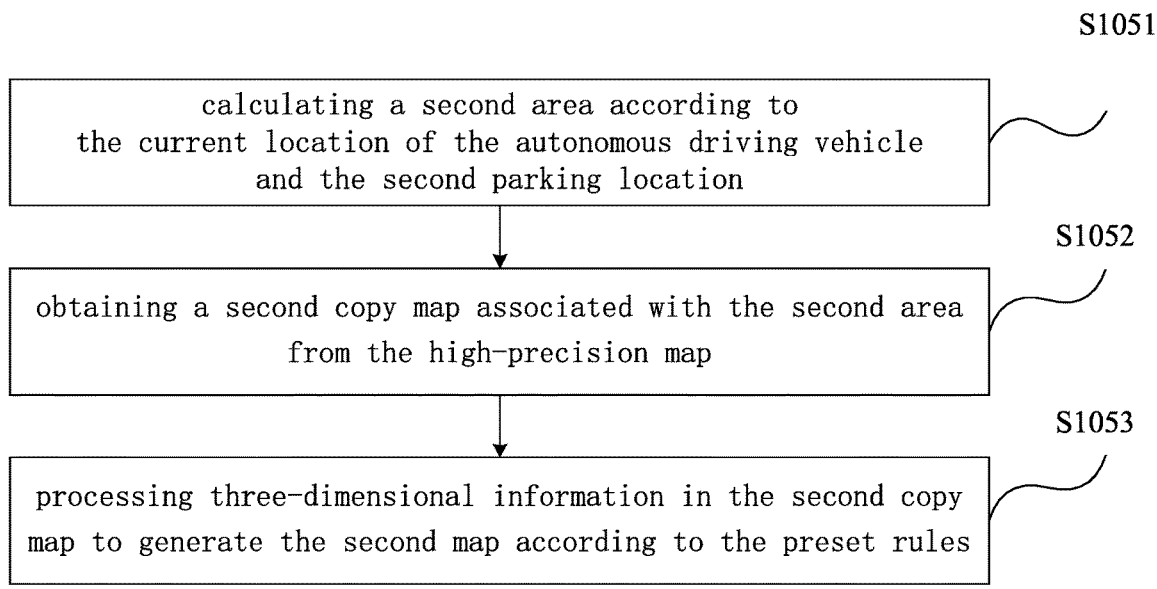
FIG. 5 illustrates a third sub flow diagram of a method for selecting parking location in accordance with the first embodiment.

Referring to FIG. 5, FIG. 5 illustrates a third sub flow diagram of a method for selecting parking location in accordance with the first embodiment. The step S105 includes the following steps.

In step S1051, a second area is calculated according to the current location of the autonomous driving vehicle and the second parking location. The second area is an area with a designated range of the current location of the user. For example, the second area is an area with the current location as a center and 10 kilometers as radius. The second area should be calculated based on actual geographic information.

In step S1052, a second copy map associated with the second area is obtained from the high-precision map.

In step S1053, three-dimensional information in the second copy map is processed to generate the second map according to the preset rules. Detail content about step S1053 can refer to step S10531-step S10535.

In this embodiment, the second map is constructed according to the current location of the autonomous driving vehicle and the high-precision map. The second map is constructed including only the current location of the autonomous driving vehicle and the designated range of the parking location, which saves amount of calculation and makes the autonomous driving vehicle react faster.

Figure 6:
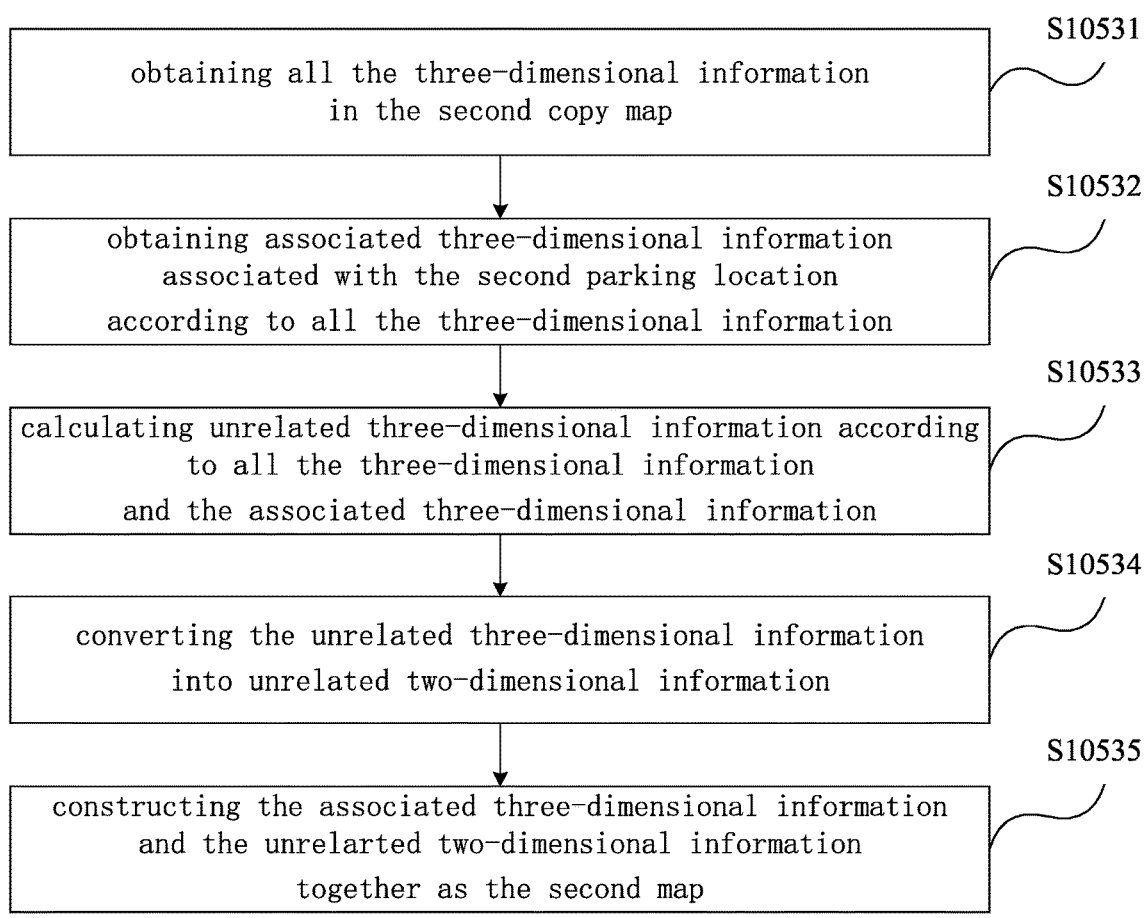
FIG. 6 illustrates a fourth sub flow diagram of a method for selecting parking location in accordance with the first embodiment.

Referring to FIG. 6, FIG. 6 illustrates a fourth sub flow diagram of a method for selecting parking location in accordance with the first embodiment. The step S1053 includes the following steps.

In step S10531, all the three-dimensional information in the second copy map is obtained.

In step S10532, associated three-dimensional information associated with the second parking location is obtained according to all the three-dimensional information.

In step S10533, unrelated three-dimensional information is calculated according to all the three-dimensional information and the associated three-dimensional information.

In step S10534, the unrelated three-dimensional information is converted into unrelated two-dimensional information.

In step S10535, the associated three-dimensional information and the unrelated two-dimensional information are constructed together as the second map.

In this embodiment, the unrelated three-dimensional information is converted into the unrelated two-dimensional information, so part of the unrelated three-dimensional information is hidden. So that the user can more intuitively know relationship between the current location of the autonomous driving vehicle and the current location of himself/herself based on the unrelated two-dimensional information. Therefor, the user can select the parking location more accurately, so that the autonomous driving vehicle can drive to the parking location as soon as possible.

Figure 7:
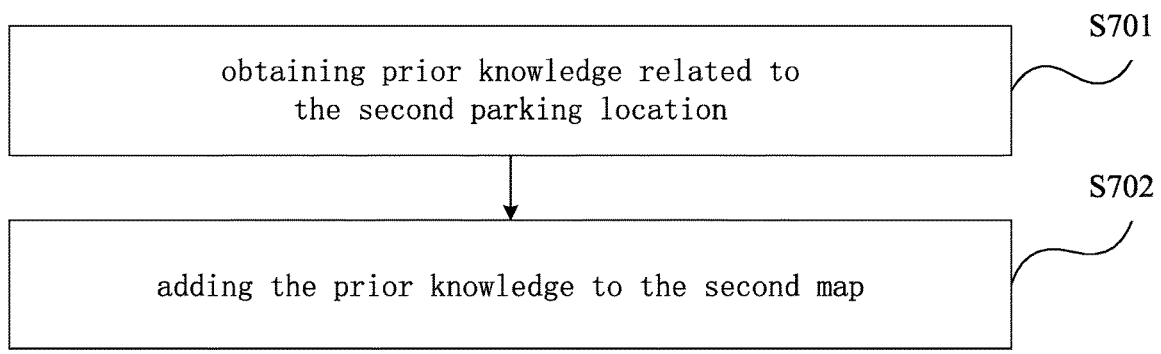
FIG. 7 illustrates a sub flow diagram of a method for selecting parking location in accordance with a third embodiment.

Referring to FIG. 7, FIG. 7 illustrates a sub flow diagram of a method for selecting parking location in accordance with a third embodiment. The difference between the method for selecting parking location in accordance with the third embodiment and the first embodiment is that prior knowledge related to the parking location is obtained, and the method for selecting parking location in accordance with the third embodiment further includes the following steps.

Figure 11:
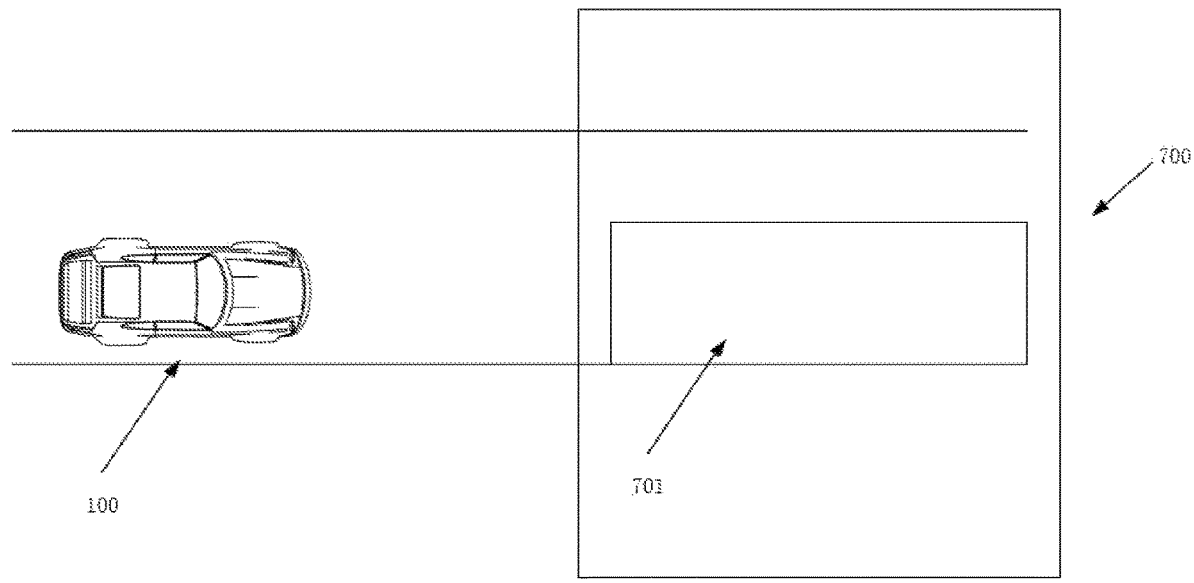
FIG. 11 illustrates schematic diagram of scenario in accordance with the third embodiment.

In step S701, prior knowledge related to the second parking location is obtained. In detail, after the autonomous driving vehicle 100 obtains the parking location, the prior knowledge related to a target location is searched in a prior knowledge base of the high-precision map. The prior knowledge base is a database configured to store guiding suggestions for driving of the autonomous driving vehicle in the high-precision map. In detail, referring to FIG. 11, a destination of the autonomous driving vehicle 100 is one location in a first region 700. The autonomous driving vehicle 100 obtains the prior knowledge about the first region 700.

In step S702, the prior knowledge is added to the second map. In detail, referring to FIG. 11, there is an unlined parking area 701 in the first region 700. The unlined parking area 701 is not marked on general high-precision maps. The second map with the prior knowledge can display the unlined parking area 701 for the user to select.

In the above embodiment, the second map is constructed according to the prior knowledge related to the parking location. The second map about actual environment near the parking location is constructed more accurately. Further, the second map is updated timely, which can provide the user with better address selection services, enable the user to select a satisfactory parking location, and provide the user with a better riding experience.

Figure 8:
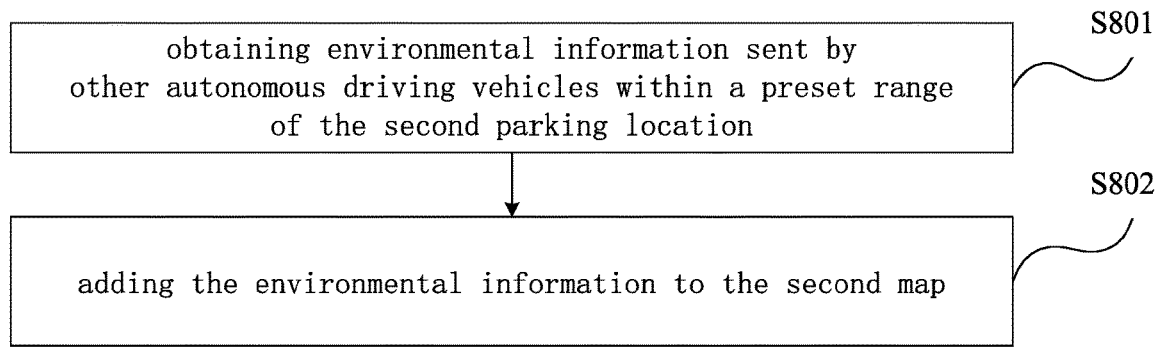
FIG. 8 illustrates a sub flow diagram of a method for selecting parking location in accordance with a fourth embodiment.

Referring to FIG. 8, FIG. 8 illustrates a sub flow diagram of a method for selecting parking location in accordance with a fourth embodiment. The difference between the method for selecting parking location in accordance with the fourth embodiment and the first embodiment is that environmental information sent by other autonomous driving vehicles near the parking location is obtained, and the method for selecting parking location in accordance with the third embodiment further includes the following steps.

Figure 12:
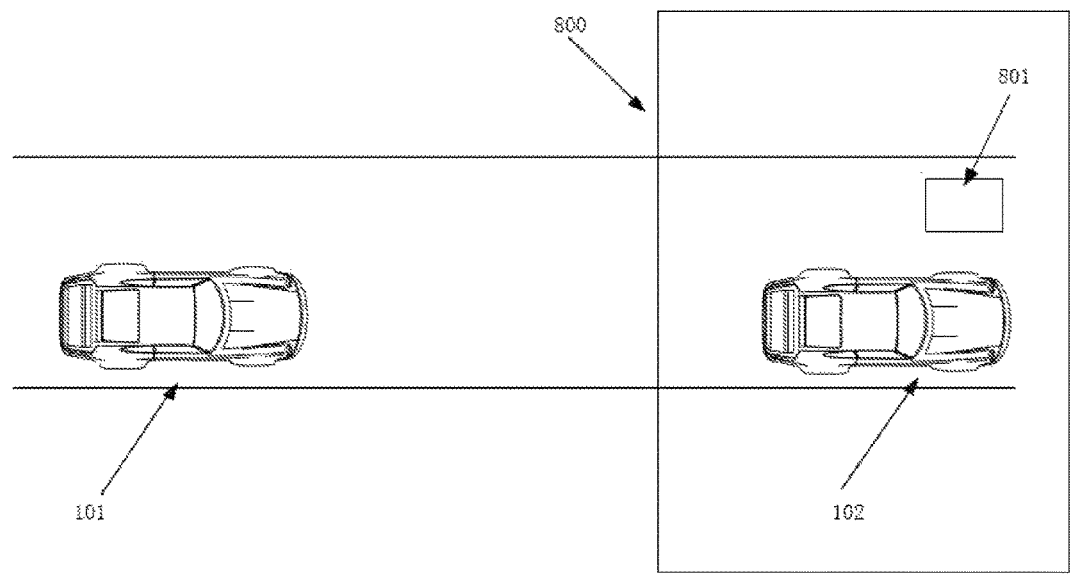
FIG. 12 illustrates schematic diagram of scenario in accordance with the fourth embodiment.

In step S801, environmental information sent by other autonomous driving vehicles within a preset range of the second parking location is obtained. A value of the preset range is set according to actual needs. In detail, referring to FIG. 12, a destination of the autonomous driving vehicle 101 is a second region 800. The autonomous driving vehicle 101 obtains information about the second region 800 sent by the autonomous driving vehicle 102 through 4G or 5G signals while driving to the second region 800. The autonomous driving vehicle 102 is within 100 meters of the second region 800. In detail, there has just been a car accident near the second region 800, and the autonomous driving vehicle 102 is parked near the second region 800. The autonomous driving vehicle 102 sends information about the car accident to other autonomous driving vehicles whose destination is the second region 800. The information about the car accident includes road section where the car accident occurred and car accident area 801 where the car accident occurred. The autonomous driving vehicle 101 obtains the car accident information.

In step S802, the environmental information is added to the second map. In detail, the autonomous driving vehicle 101 adds the car accident information to the second map.

In the above embodiment, the second map is constructed according to the environmental information sent by other autonomous driving vehicles near the parking location. The second map about actual environment near the parking location is constructed more accurately. Further, the second map is updated timely, which can provide the user with better address selection services, enable the user to select a satisfactory parking location, and provide the user with a better riding experience.

Figure 9:
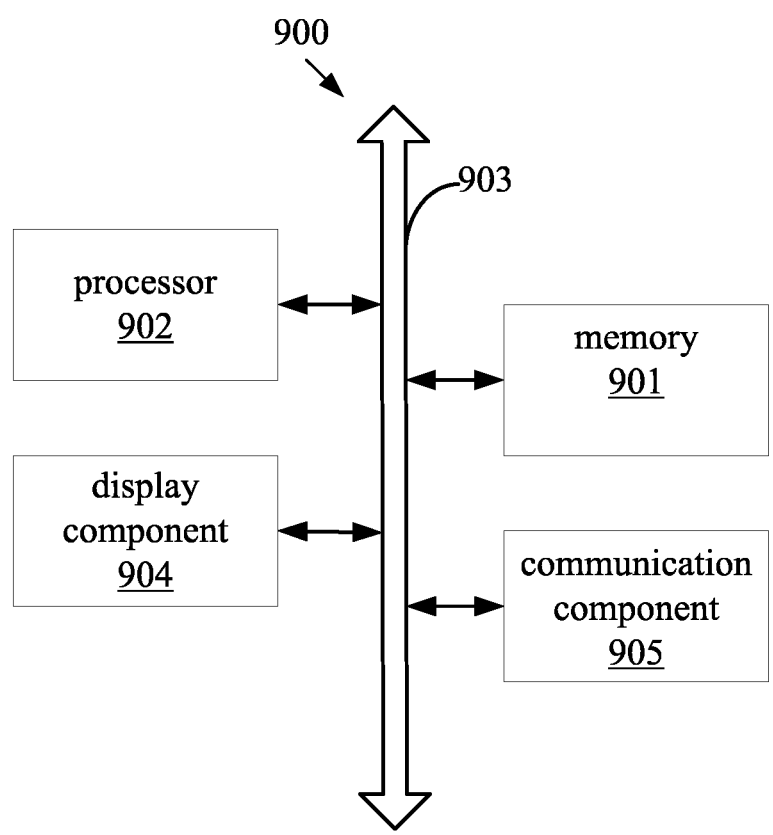
FIG. 9 illustrates a schematic diagram of an intelligent control device.

Referring to FIG. 9, FIG. 9 illustrates a schematic diagram of an intelligent control device. The intelligent control device 900 includes a memory 901 and a processor 902. In detail, the memory 901 configured to store program instructions. The processor 902 configured to execute the program instructions to enable the intelligent control device 900 to perform method for selecting parking location for an autonomous driving vehicle.

The memory 901 includes at least one type of readable storage medium, which includes flash memory, hard disk, multimedia card, card-type memory (for example, SD or DX memory, etc.), magnetic memory, disk, optical disc, etc. The memory 901 in some embodiments may be an internal storage unit of a computer device, such as a hard disk of a computer device. The memory 901, in other embodiments, can also be a storage device for external computer devices, such as a plug-in hard disk, a Smart Media Card (SMC), a Secure Digital (SD) Card, a Flash Card, etc. equipped on a computer device. Further, the memory 901 may include both the internal and external storage units of a computer device. The memory 901 can not only be used to store the application software and all kinds of data installed in the computer equipment, but also can be used to temporarily store the data that has been output or will be output.

The processor 902 in some embodiments may be a Central Processing Unit (CPU), controller, microcontroller, microprocessor, or other data processing chip used to run program code or process data stored in the memory 901. In detail, the processor 902 performs program instructions to achieve the method for selecting parking location.

Further, the intelligent control device 900 may also include a bus 903. The bus 903 can be either a peripheral component interconnect (PCI) bus or an extended industry standard architecture (EISA) bus. The bus can be divided into address bus, data bus, control bus and so on. For ease of representation, FIG. 9 is represented by a single thick line, but does not indicate that there is only one bus or one type of bus.

Further, the intelligent control device 900 may also include a display component 904. The display component 904 can be LED (Light Emitting Diode) display, LCD display, touch LCD display and OLED (Organic Light-Emitting Diode) touchscreen, etc. The display component 904 may also be appropriately called the display device or display unit for displaying the information processed in the intelligent control device 900 and for displaying the visual user interface.

Further, the intelligent control device 900 may also include a communication component 905. Optionally, the communication component 905 may include a wired communication component and/or a wireless communication component (for example, a WI-FI communication component, a Bluetooth communication component, etc.), which is usually used to establish a communication connection between the intelligent control device 900 and other computer devices.

FIG. 9 shows the intelligent control device 900 only with components 901-905. To the understanding of technicians in this field, the structure shown in FIG. 9 does not constitute a qualification for the intelligent control device 900, which may include fewer or more components than illustrated, or some combination of components, or a different arrangement of components.

The technicians in this field can clearly understand the specific working process of the system, device and unit described above, for convenience and simplicity of description, can refer to the corresponding process in the embodiment of the method described above, and will not be repeated here.

In the several embodiments provided in this disclosure, it should be understood that the systems, devices and methods disclosed may be implemented in other ways. For example, the device embodiments described above is only a schematic. For example, the division of the units, just as a logical functional division, the actual implementation can have other divisions, such as multiple units or components can be combined with or can be integrated into another system, or some characteristics can be ignored, or does not perform. Another point, the coupling or direct coupling or communication connection shown or discussed may be through the indirect coupling or communication connection of some interface, device or unit, which may be electrical, mechanical or otherwise.

The unit described as a detached part may or may not be physically detached, the parts shown as unit may or may not be physically unit, that is, it may be located in one place, or it may be distributed across multiple network units. Some or all of the units can be selected according to actual demand to achieve the purpose of this embodiment scheme.

In addition, the functional units in each embodiment of this disclosure may be integrated in a single processing unit, or may exist separately, or two or more units may be integrated in a single unit. The integrated units mentioned above can be realized in the form of hardware or software functional units.

The integrated units, when implemented as software functional units and sold or used as independent product, can be stored in a computer readable storage medium. Based on this understanding, the technical solution of this disclosure in nature or the part contribute to existing technology or all or part of it can be manifested in the form of software product. The computer software product stored on a storage medium, including several instructions to make a computer equipment (may be a personal computer, server, or network device, etc.) to perform all or part of steps of each example embodiments of this disclosure. The storage medium mentioned before includes U disk, floating hard disk, ROM (Read-Only Memory), RAM (Random Access Memory), floppy disk or optical disc and other medium that can store program codes.

Figure 10:
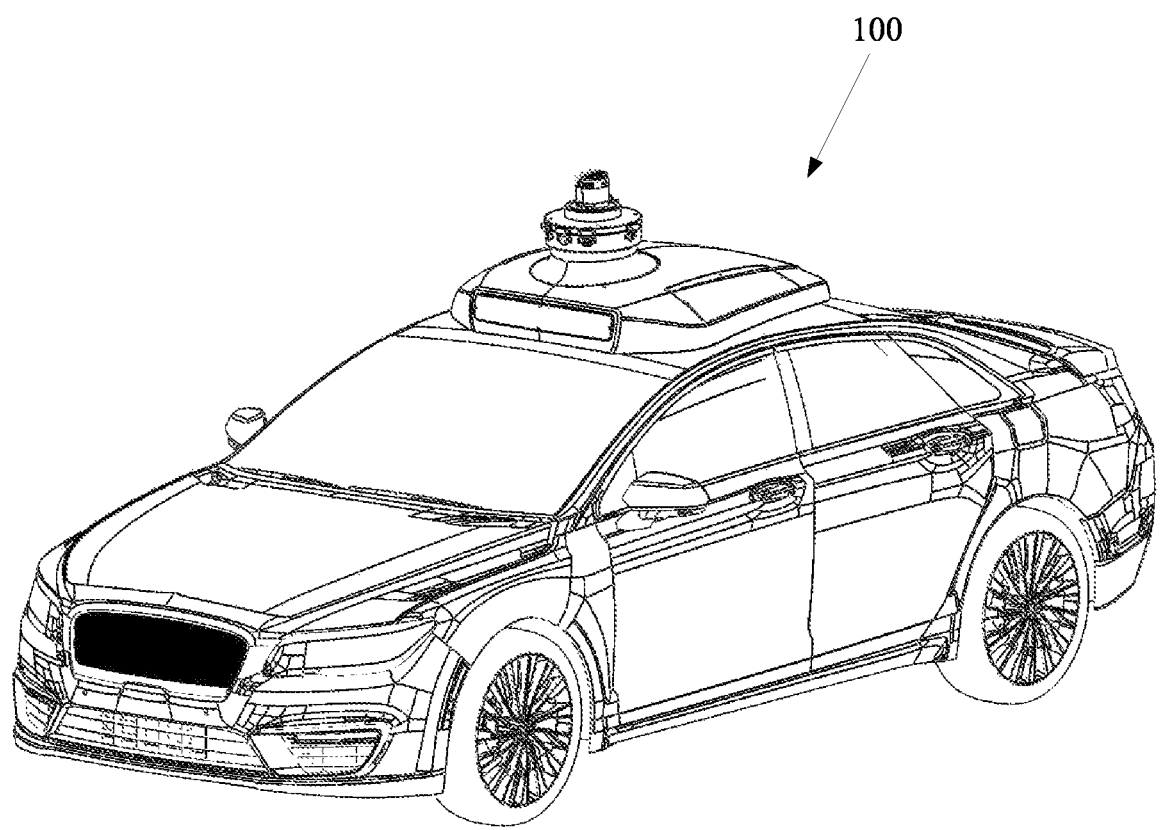
FIG. 10 illustrates a schematic diagram of an autonomous driving vehicle.

Referring to FIG. 10, FIG. 10 illustrates a schematic diagram of an autonomous driving vehicle. The autonomous driving vehicle 100 includes a car body (not labeled) and an intelligent control device (not shown). Structures of the intelligent control device (not shown) refer to the above embodiments. Since the autonomous driving vehicle 100 adopts all technical solutions of all the above embodiments, the autonomous driving vehicle 100 has at least all beneficial effects brought by the technical solutions of the above embodiments.

It should be noted that the embodiments number of this disclosure above is for description only and do not represent the advantages or disadvantages of embodiments. And in this disclosure, the term "including", "include" or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence "including a . . . " do not preclude the existence of other similar elements in the process, devices, items, or methods that include the elements.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A method for selecting parking location for an autonomous driving vehicle, comprising:

obtaining a request of a user, the request comprising a current location of the user and a first parking location inputted by the user;

constructing a first map according to the current location of the user, the first parking location, and a high-precision map, and displaying the first map, the first map comprising one or more second parking locations for the user to select, the one or more second parking locations being generated according to the first parking location;

obtaining the second parking location selected by the user on the first map;

controlling the autonomous driving vehicle to drive to the second parking location, and calculating distance between a current location of the autonomous driving vehicle and the second parking location;

when the distance is less than a preset distance, constructing a second map according to the current location of the autonomous driving vehicle, the second parking location, and the high-precision map, and displaying the second map, the second map comprising confirmation information of the second parking location for the user to select;

determining whether the confirmation information of the second parking location is obtained;

controlling the autonomous driving vehicle to drive to the second parking location to perform a parking operation when the confirmation information of the second parking location is obtained;

displaying a third parking location on the second map for the user to select when the confirmation information of the second parking location is not obtained; and controlling the autonomous driving vehicle to drive to the third parking location to perform the parking operation when the third parking location selected by the user on the second map is obtained.

2. The method as claimed in claim 1, wherein constructing a first map according to the current location of the user, the first parking location, and a high-precision map, and displaying the first map comprising:

calculating a first area according to the current location of the user and the first parking location;

obtaining a first copy map associated with the first area from the high-precision map; and processing three-dimensional information in the first copy map to generate the first map according to preset rules.

3. The method as claimed in claim 2, wherein processing three-dimensional information in the first copy map according to preset rules to generate the first map comprising:

obtaining all the three-dimensional information in the first copy map;

obtaining associated three-dimensional information associated with the first parking location according to all the three-dimensional information;
calculating unrelated three-dimensional information according to all the three-dimensional information and the associated three-dimensional information;
converting the unrelated three-dimensional information into unrelated two-dimensional information; and
constructing the associated three-dimensional information and the unrelated two-dimensional information together as the first map.

4. The method as claimed in claim 1, further comprising:
controlling the autonomous driving vehicle to stop and sending an inquiry request to a user terminal when the autonomous driving vehicle reaches the second parking location;
obtaining the confirmation information;
determining whether the confirmation information is door opening information;
unlocking the autonomous driving vehicle when the confirmation information is the door opening information;
displaying a fourth parking location on the second map for the user to select when the confirmation information is not the door opening information; and
controlling the autonomous driving vehicle to drive to the fourth parking location to perform the parking operation when the fourth parking location selected by the user on the second map is obtained.

5. The method as claimed in claim 1, wherein constructing a second map according to the current location of the autonomous driving vehicle, the second parking location comprising:
calculating a second area according to the current location of the autonomous driving vehicle and the second parking location;
obtaining a second copy map associated with the second area from the high-precision map; and
processing three-dimensional information in the second copy map to generate the second map according to the preset rules.

6. The method as claimed in claim 5, wherein processing three-dimensional information in the second copy map according to the preset rules to generate the second map comprising:
obtaining all the three-dimensional information in the second copy map;
obtaining associated three-dimensional information associated with the second parking location according to all the three-dimensional information;
calculating unrelated three-dimensional information according to all the three-dimensional information and the associated three-dimensional information;
converting the unrelated three-dimensional information into unrelated two-dimensional information; and
constructing the associated three-dimensional information and the unrelated two-dimensional information together as the second map.

7. The method as claimed in claim 6, further comprising:
obtaining prior knowledge related to the second parking location; and
adding the prior knowledge to the second map.

8. The method as claimed in claim 6, further comprising:
obtaining environmental information sent by other autonomous driving vehicles within a preset range of the second parking location; and
adding the environmental information to the second map.

9. An intelligent control device, comprising:
a memory configured to store program instructions; and
a processor configured to execute the program instructions to enable the intelligent control device to perform a method for selecting parking location for an autonomous driving vehicle, wherein the method comprising:
obtaining a request of a user, the request comprising a current location of the user and a first parking location inputted by the user;
constructing a first map according to the current location of the user, the first parking location, and a high-precision map, and displaying the first map, the first map comprising one or more second parking locations for the user to select, the one or more second parking locations being generated according to the first parking location;
obtaining the second parking location selected by the user on the first map;
controlling the autonomous driving vehicle to drive to the second parking location, and calculating distance between a current location of the autonomous driving vehicle and the second parking location;
when the distance is less than a preset distance, constructing a second map according to the current location of the autonomous driving vehicle, the second parking location, and the high-precision map, and displaying the second map, the second map comprising confirmation information of the second parking location for the user to select;
determining whether the confirmation information of the second parking location is obtained;
controlling the autonomous driving vehicle to drive to the second parking location to perform a parking operation when the confirmation information of the second parking location is obtained;
displaying a third parking location on the second map for the user to select when the confirmation information of the second parking location is not obtained; and
controlling the autonomous driving vehicle to drive to the third parking location to perform the parking operation when the third parking location selected by the user on the second map is obtained.

10. The intelligent control device as claimed in claim 9, wherein constructing a first map according to the current location of the user, the first parking location, and a high-precision map, and displaying the first map comprising:
calculating a first area according to the current location of the user and the first parking location;
obtaining a first copy map associated with the first area from the high-precision map; and
processing three-dimensional information in the first copy map to generate the first map according to preset rules.

11. The intelligent control device as claimed in claim 10, wherein processing three-dimensional information in the first copy map according to preset rules to generate the first map comprising:
obtaining all the three-dimensional information in the first copy map;
obtaining associated three-dimensional information associated with the first parking location according to all the three-dimensional information;
calculating unrelated three-dimensional information according to all the three-dimensional information and the associated three-dimensional information;

converting the unrelated three-dimensional information into unrelated two-dimensional information; and constructing the associated three-dimensional information and the unrelated two-dimensional information together as the first map.

12. The intelligent control device as claimed in claim 9, further comprising:

controlling the autonomous driving vehicle to stop and sending an inquiry request to a user terminal when the autonomous driving vehicle reaches the second parking location;

obtaining the confirmation information;

determining whether the confirmation information is door opening information;

unlocking the autonomous driving vehicle when the confirmation information is the door opening information;

displaying a fourth parking location on the second map for the user to select when the confirmation information is not the door opening information; and controlling the autonomous driving vehicle to drive to the fourth parking location to perform the parking operation when the fourth parking location selected by the user on the second map is obtained.

13. The intelligent control device as claimed in claim 9, wherein constructing a second map according to the current location of the autonomous driving vehicle, the second parking location comprising:

calculating a second area according to the current location of the autonomous driving vehicle and the second parking location;

obtaining a second copy map associated with the second area from the high-precision map; and processing three-dimensional information in the second copy map to generate the second map according to the preset rules.

14. The intelligent control device as claimed in claim 13, wherein processing three-dimensional information in the second copy map according to the preset rules to generate the second map comprising:

obtaining all the three-dimensional information in the second copy map;

obtaining associated three-dimensional information associated with the second parking location according to all the three-dimensional information;

calculating unrelated three-dimensional information according to all the three-dimensional information and the associated three-dimensional information;

converting the unrelated three-dimensional information into unrelated two-dimensional information; and constructing the associated three-dimensional information and the unrelated two-dimensional information together as the second map.

15. The intelligent control device as claimed in claim 14, further comprising:

obtaining prior knowledge related to the second parking location; and adding the prior knowledge to the second map.

16. The intelligent control device as claimed in claim 14, further comprising:

obtaining environmental information sent by other autonomous driving vehicles within a preset range of the second parking location; and adding the environmental information to the second map.

17. An autonomous driving vehicle, comprising:

a car body; and an intelligent control device, the intelligent control device comprising:

a memory configured to store program instructions; and a processor configured to execute the program instructions to enable the intelligent control device to perform a method for selecting parking location for an autonomous driving vehicle, wherein the method comprising:

obtaining a request of a user, the request comprising a current location of the user and a first parking location inputted by the user;

constructing a first map according to the current location of the user, the first parking location, and a high-precision map, and displaying the first map, the first map comprising one or more second parking locations for the user to select, the one or more second parking locations being generated according to the first parking location;

obtaining the second parking location selected by the user on the first map;

controlling the autonomous driving vehicle to drive to the second parking location, and calculating distance between a current location of the autonomous driving vehicle and the second parking location;

when the distance is less than a preset distance, constructing a second map according to the current location of the autonomous driving vehicle, the second parking location, and the high-precision map, and displaying the second map, the second map comprising confirmation information of the second parking location for the user to select;

determining whether the confirmation information of the second parking location is obtained;

controlling the autonomous driving vehicle to drive to the second parking location to perform a parking operation when the confirmation information of the second parking location is obtained;

displaying a third parking location on the second map for the user to select when the confirmation information of the second parking location is not obtained; and controlling the autonomous driving vehicle to drive to the third parking location to perform the parking operation when the third parking location selected by the user on the second map is obtained.

18. The autonomous driving vehicle as claimed in claim 17, wherein constructing a first map according to the current location of the user, the first parking location, and a high-precision map, and displaying the first map comprising:

calculating a first area according to the current location of the user and the first parking location;

obtaining a first copy map associated with the first area from the high-precision map; and processing three-dimensional information in the first copy map to generate the first map according to preset rules.

19. The autonomous driving vehicle as claimed in claim 17, further comprising:

controlling the autonomous driving vehicle to stop and sending an inquiry request to a user terminal when the autonomous driving vehicle reaches the second parking location;

obtaining the confirmation information;

determining whether the confirmation information is door opening information;

unlocking the autonomous driving vehicle when the confirmation information is the door opening information;

displaying a fourth parking location on the second map for the user to select when the confirmation information is not the door opening information; and controlling the autonomous driving vehicle to drive to the fourth parking location to perform the parking operation when the fourth parking location selected by the user on the second map is obtained.

20. The autonomous driving vehicle as claimed in claim 17, wherein constructing a second map according to the current location of the autonomous driving vehicle, the second parking location comprising:

calculating a second area according to the current location of the autonomous driving vehicle and the second parking location;

obtaining a second copy map associated with the second area from the high-precision map; and processing three-dimensional information in the second copy map to generate the second map according to the preset rules.

* * * * *